Nov. 29, 1955
R. U. LEMIEUX
2,725,392
PREPARATION OF ALDEHYDOPENTADECANOIC
ACID AND DIALDEHYDOTETRADECANE
Filed April 9, 1952
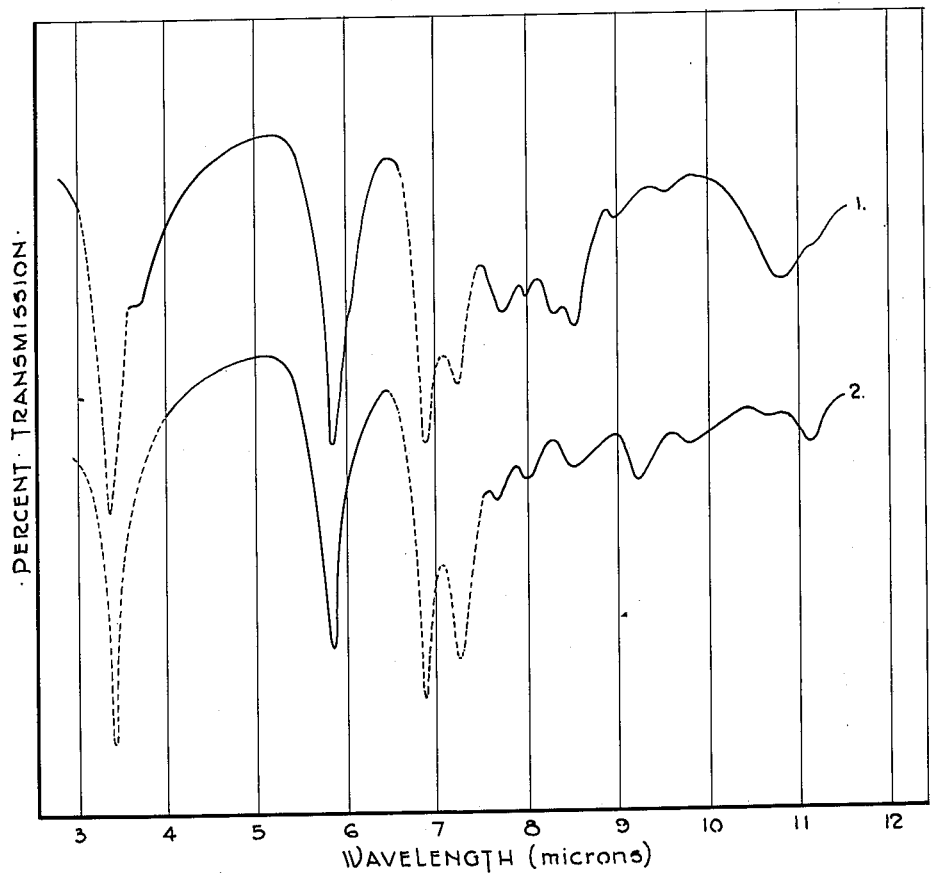
Infrared spectra of 30% dispersions in hydrocarbon oil.
Curve 1. Aldehydopentadecanoic acid.
Curve 2. Dialdehydotetradecane.
-------- Hydrocarbon oil absorption bands.
INVENTOR.
Raymond U. Lemieux,
BY
Alex. E. MacRae
Attorney.

United States Patent Office 2,725,392
Patented Nov. 29, 1955

2,725,392
PREPARATION OF ALDEHYDOPENTADECANOIC ACID AND DIALDEHYDOTETRADECANE

Raymond U. Lemieux, Saskatoon, Saskatchewan, Canada, assignor to National Research Council, Ottawa, Ontario, Canada, a corporation of Canada Application April 9, 1952, Serial No. 281,452

3 Claims. (Cl. 260—406)

This invention relates to the treatment of the ustilic acids, 15,16-dihydroxyhexadecanoic (I) and 2,15,16-trihydroxyhexadenoic (II), for the production of aldehydopentadecanoic acid (III) and dialdehydotetradecane (IV), which compounds have the following formulae:

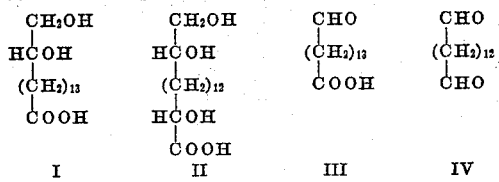

The aldehydopentadecanoic acid (III) has M. P. 71–72° C. and is characterized by the infrared spectrum, shown in the drawing, of a 30% dispersion in hydrocarbon oil, the wave lengths of the characteristic absorption maxima expressed in microns being as follows: 10.85, 9.53, 8.94, 8.52, 8.31, 7.98, 7.72 and 5.86.

The dialdehydotetradecane (IV) has M. P. 42–45° C. and is characterized by the infrared spectrum, shown in the drawing, of a 30% dispersion in hydrocarbon oil, the wave lengths of the characteristic absorption maxima expressed in microns being as follows: 11.16, 9.83, 9.24, 8.53, 8.02, 7.67, 5.84.

In accordance with the invention the ustilic acids are treated with glacial acetic acid and sodium bismuthate, or the acids may be first separated and treated individually.

When the 15,16-dihydroxyhexadecanoic acid individually is used lead tetraacetate or sodium bismuthate may be used as the oxidizing agent in producing the aldehydopentadecanoic acid. When an alkali metal salt of the 15,16-dihydroxyhexadecanoic acid is used sodium periodate is an effective oxidizing agent in forming the aldehydopentadecanoic acid.

The two compounds thus produced may be further treated by catalytic hydrogenation to form respectively 15-hydroxypentadenoic acid (V) which is valuable for the preparation of the musk 15-pentadecanolactone and 1,14-dihydroxytetradecane (VI) which is valuable for the preparation of the musk tetradecamethylene carbonate

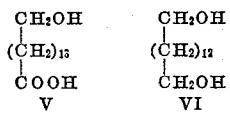

The following examples are illustrative of the method of the invention and also of the hydrogenation treatment:

1. The ustilic acid mixture, 7.0 gm., was suspended in 50 ml. of glacial acetic acid and the mixture was heated to 45° C. On the addition of sodium bismuthate, NaBiO₃, there was liberated heat and by controlling the rate of addition of the oxidant, the temperature was maintained at 50±4° C. The oxidant, 12.0 gm., was added over a period of 40 minutes. The resulting clear solution was diluted with 100 ml. of benzene and this solution was washed free of acetic acid using 40 ml. amounts of water. The resulting benzene solution was evaporated in vacuo to yield 5.81 gm. of an oil which solidified at room temperature. This material is a mixture comprising aldehydopentadecanoic acid and dialdehydotetradecane.

2. The ustilic acid mixture, 7.0 gm., was oxidized to the mixture of aldehydopentadecanoic acid and dialdehydotetradecane as described above. The material, 5.74 gm., was dissolved in 50 ml. of ethanol and the solution was made neutral to phenol red indicator by titration with normal potassium hydroxide solution. Ether, 100 ml., was added to yield a homogeneous solution which was diluted with 100 ml. of water. The bottom aqueous layer which separated was washed with 50 ml. of ether. The two ether extracts were combined and washed with 50 ml. of water and this water extract was combined with the first aqueous extract. The ether solution was dried over sodium sulphate to yield 1.34 gm. of crude dialdehydotetradecane. The aqueous mixture was poured into 100 ml. of hot water which contained 3 ml. of concentrated hydrochloric acid, the oil which formed crystallized on cooling and was gathered by filtration and washed with water. The material was crude aldehydopentadecanoic acid, 3.96 gm.

3. The ustilic acid, 15,16-dihydroxyhexadecanoic, 1.45 gm., was suspended in 20 ml. of acetic acid and 2.50 gm. of lead tetraacetate was added. The mixture was shaken for one hour, diluted with 50 ml. of benzene, and added to 50 ml. of water which contained a little glycerol to destroy the excess oxidant. After shaking, the benzene layer was isolated, washed several times with water to remove the acetic acid and dried. Removal of the benzene by evaporation in vacuo yielded 1.25 gm., 94% yield, of crude aldehydopentadecanoic acid, M. P. 67–71° C. Two recrystallizations from acetone gave an essentially pure compound, M. P. 71–72° C.

4. The ustilic acid, 2,15,16-trihydroxyhexadecanoic, 1.06 gm., was suspended in 15 ml. of acetic acid and the mixture was warmed to 45° C. Sodium bismuthate (about 80% pure) 2.14 gm., was added to the mechanically stirred mixture at such a rate as to keep the reaction temperature between 45 and 50° C. After the oxidant was added, stirring was continued and the reaction mixture was kept at 45° C. until solution was complete and the bismuthate completely decolorized. Benzene, 30 ml., was added and 15 ml. of water. After shaking, the benzene layer was isolated and washed free of acetic acid by several extractions with water. The dried benzene solution evaporated in vacuo to yield 0.64 gm. of an oil which soon crystallized. The substance was dissolved in 3 ml. of benzene and diluted with 10 ml. of 30–40 petroleum ether. The precipitate which formed was removed by filtration and evaporation of the filtrate in vacuo yielded 0.39 gm. of essentially crystalline dialdehydotetradecane, M. P. 42–45° C. Dialdehydotetradecane is extremely susceptible to auto-oxidation, a property which renders the substance exceedingly difficult to obtain in a high state of purity.

5. The potassium salt of the ustilic acid mixture, 5.00 gm., was dissolved by heating in 150 ml. of water and 36.4 m. e. of sodium periodate was added in 50 ml. of water. The solution was kept at 60° C. for fifteen minutes and acidified by the addition of hydrochloric acid. The resulting mixture was extracted three times with ether and the combined extracts were washed with water. The ether was removed by distillation to yield a mixture containing aldehydopentadecanoic acid.

The reaction temperature is preferably within the range 45°–65° C., since the reaction is considerably slower below 45° C. and tends to lose its specificity above 65° C.

I claim:

1. As a new composition a mixture consisting essentially of aldehydopentadecanoic acid and dialdehydotetradecane.
2. Aldehydopentadecanoic acid.
3. Dialdehydotetradecane.

References Cited in the file of this patent

Noller et al.: Journal American Chemical Society, 48, 1077 (1926).

Fieser et al.: "Organic Chemistry," 1950, page 411.